United States Patent [19]

Sasuta et al.

[11] Patent Number: 5,491,835

[45] Date of Patent: Feb. 13, 1996

[54] METHOD FOR MAINTAINING AUDIENCE CONTINUITY OF A COMMUNICATION GROUP CALL

[75] Inventors: Michael D. Sasuta, Mundelein; John A. Wolfe, Elgin, both of Ill.

[73] Assignee: Motorola, Inc., Schaumburg, Ill.

[21] Appl. No.: 198,932

[22] Filed: Feb. 18, 1994

[51] Int. Cl.$^6$ ............................................. H04Q 7/28
[52] U.S. Cl. ..................... 455/34.1; 455/17; 455/54.1
[58] Field of Search ......................... 455/17, 34.1, 34.2, 455/54.1

[56] References Cited

U.S. PATENT DOCUMENTS

| | | | |
|---|---|---|---|
| 4,646,345 | 2/1987 | Zudnek et al. | 455/34.1 |
| 4,972,460 | 11/1990 | Sasuta | 455/34.1 |
| 5,123,110 | 6/1992 | Grube | 455/34.1 |
| 5,218,354 | 6/1993 | Hess | 455/34.1 |
| 5,235,631 | 8/1993 | Grube et al. | 455/34.1 |
| 5,274,837 | 12/1993 | Childress et al. | 455/34.2 |
| 5,279,521 | 1/1994 | Johlie et al. | 455/34.1 |
| 5,335,350 | 8/1994 | Felderman et al. | 455/17 |

FOREIGN PATENT DOCUMENTS 2265791 10/1993 United Kingdom ................. 455/17

*Primary Examiner*—Dwayne D. Bost
*Attorney, Agent, or Firm*—Timothy W. Markison

[57] ABSTRACT

In a multi-site communication system (100), audience continuity of an established communication group call can be maintained by a central controller (116) in the following manner. Upon initial establishment of the call, the central controller (116) allocates a communication resource (105–108) of each site in a first set of sites (101–104) to the communication group and establishes an audience list of active communication units (111–115). The audience list is continually updated with information on newly transmitting communication units and relocation information of communication units already in the list throughout the group call. When the group call ends, the audience list is maintained for a predetermined period of time. If during this predetermined period of time, a subsequent group call is requested for the same communication group, the group call can be reestablished based on the information contained in the audience list.

11 Claims, 3 Drawing Sheets

METHOD FOR MAINTAINING AUDIENCE CONTINUITY OF A COMMUNICATION GROUP CALL

FIELD OF THE INVENTION

The present invention relates generally to multi-site communication systems, and in particular, to a method of maintaining a consistent audience for communications spanning multiple communication sites.

BACKGROUND OF THE INVENTION

Multiple site communication systems are known to comprise a plurality of sites, a plurality of communication units, such as mobile and portable radios, and a limited number of communication resources which are allocated to the communication units by at least one communication resource allocator, such as a central controller. Generally, a communication between two or more communication units is established when a communication resource is allocated for the communication units to use. If the communication units are located within the same site, only one communication resource needs to be allocated for the communication. If, however, the communication units are located in different sites, then a communication resource needs to be allocated in each site for the communication to occur.

For a group call (a call among several communication units that are grouped together based on commonalty of use), a communication resource must be allocated in each site that supports a member of the communication group, i.e., a member is located within the site. With such a requirement, group calls tend to take a noticeable amount of time (1 second to 30 seconds) to set-up. Most of the set-up time is spent waiting for communication resources to become available in sites that service members of the communication group. Once all the sites have an available communication resource, the group call can be executed. As would be expected, the larger the group, the longer it takes to place the group call.

There are several effective solutions for reducing the set-up time of a group call. One such solution is generally known as "Busy Override". In a busy override system, the requesting unit can elect to begin a group call without the members of the communication group that are located in sites that do not have an available communication resource. For the busy override system to be effective, the group members located in the sites that do not have an available communication resource cannot be essential participants to the group call. Another solution targets particular members of the communication group that are essential to the group call and communication resources are only allocated in the sites in which the essential members are located. Other members located in these sites can also participate in the group call, even though they were not identified as essential participants.

While both of these solutions work well to minimize set-up times for group calls, they provide little benefit for subsequent group calls that are initiated by the same communication group shortly after a group call has ended. In these situations, the subsequent call is treated like any other call and a complete set-up routine needs to be executed. Note, however, that statistical user information indicates that if a subsequent group call is initiated by the same communication group within a certain time (say, less than 10 seconds) after a group call has ended, there is a high probability that the topic of the subsequent group call will be related to that of the previous group call. For example, if the first group call was established by a communication group operated by a fire department in response to a fire, a group call initiated a few seconds after the first group call ended would still probably be related to the fire. As such, the members that participated in the first group call would more than likely be the desired members to participate in the second group call.

Therefore, a need exists for a method of maintaining audience continuity for subsequent group call requests for a previously active communication group without having to invoke an entire group call set-up routine.

DESCRIPTION OF A PREFERRED EMBODIMENT

Generally, the present invention provides a method for maintaining audience continuity for a communication group call. This is accomplished by allocating a communication resource in each site of a set of sites to established a communication group call for a particular group. (Which sites are included in the set of sites will be discussed below). Once the communication group call is established, an audience list is generated to include identities of at least two communication units of the particular communication group and identities of the sites that these units are located in. At the beginning of the group call, the communication units identified in the audience list are the communication units most likely to be active participants in the group call. As the group call proceeds, the audience list is updated to add other units that are participating in the group call and to update site locations of the units already identified in the audience list. Once transmissions cease for a predetermined time period, the communication resources allocated to the particular communication group are reclaimed, but the audience list is maintained. At this point, if a group call request is initiated for the same communication group within a subsequent predetermined time period, the group call is re-established based on the information contained in the audience list. With such a method, subsequent group calls can be established using the audience list, thus reducing group call set-up times by avoiding unnecessary delays in waiting for communication resources to become available in sites not critical to the group call.

Figure 1:
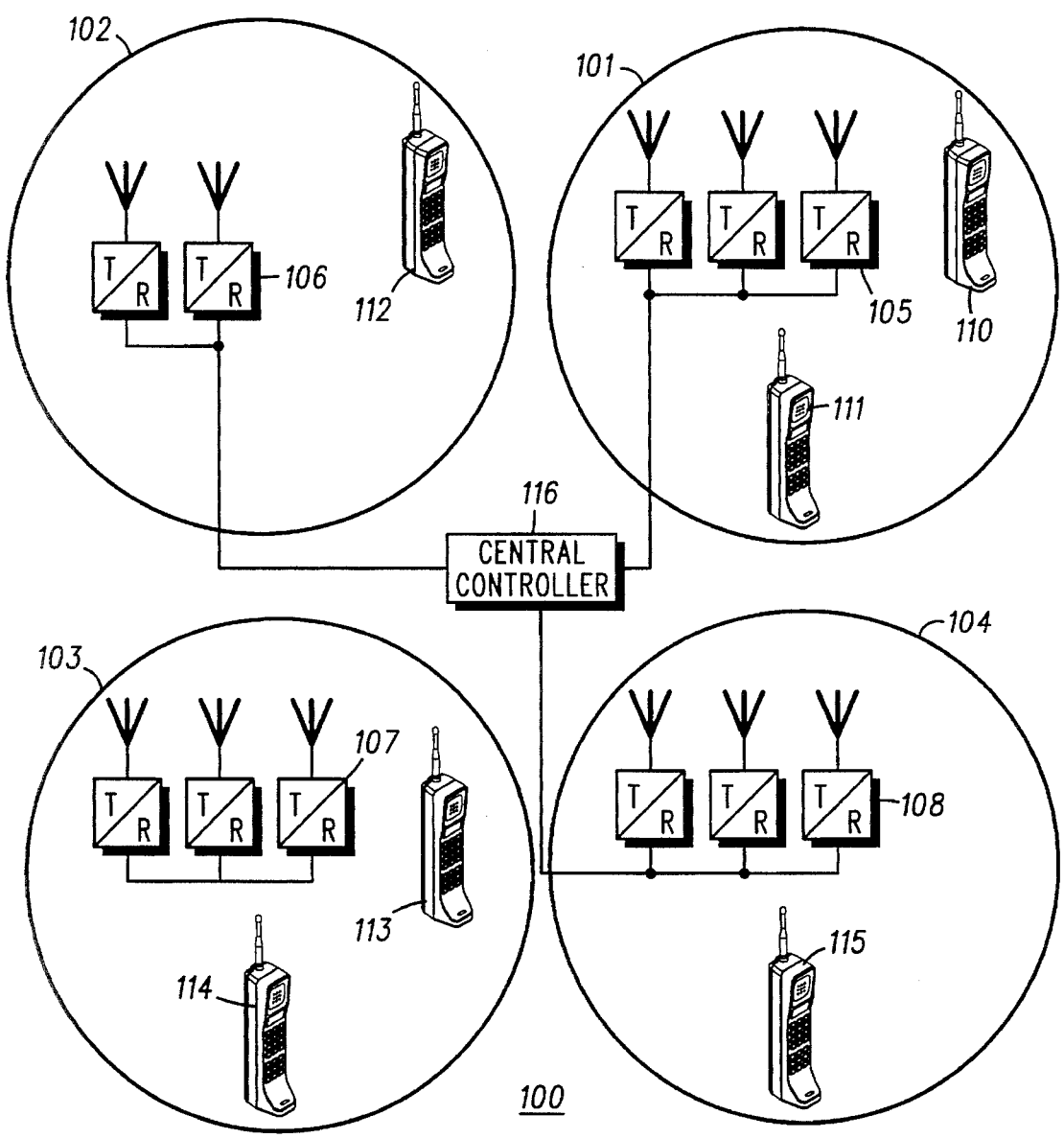
FIG. 1 illustrates a multi-site communication system in accordance with the present invention.

The present invention can be more fully described with reference to FIGS. 1–3. FIG. 1 illustrates a multi-site communication system (100) that includes multiple communication sites (sites) (101–104). Each of the sites is operably coupled to a central controller (116) and includes at least one repeater (105–108) that transceives information via communication resources. The communication resources may be multiple RF (radio frequency) channels such as pairs of frequency carriers, time division multiplex (TDM) slots, or any other RF transmission mediums. Communication units (110–115), which may be portable, mobile, or telephone radios, are located throughout the multi-site communication system (100) and are generally grouped together in communication groups. For example, communication units designated by the reference numbers 110, 113, and 114 may be in one communication group, while communication units 111, 112, and 115 may be in another communication group.

Figure 2:
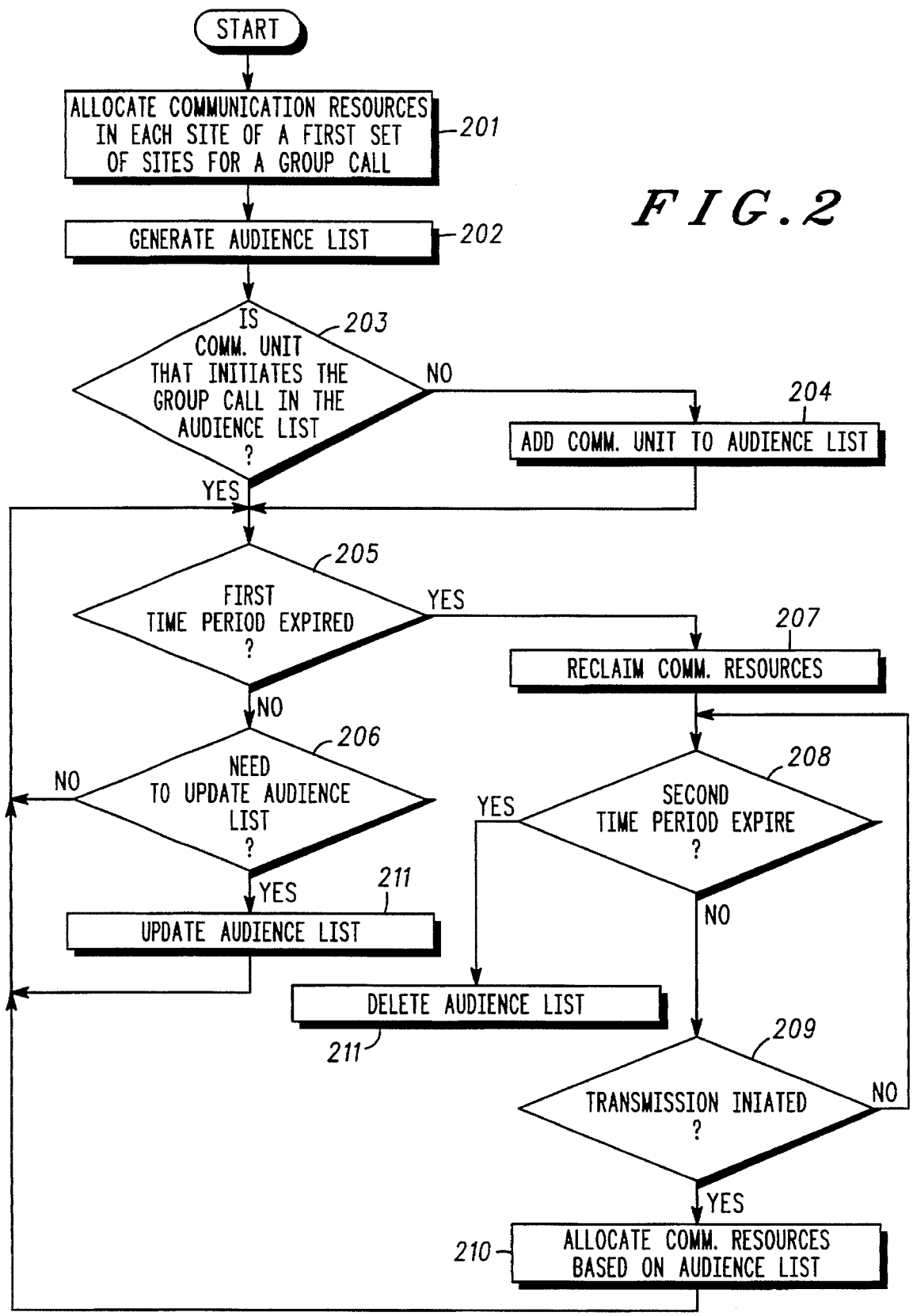
FIG. 2 illustrates a logic diagram that a communication resource allocator may incorporate to implement the present invention.

FIG. 2 illustrates a logic diagram that the central controller (116) may incorporate to implement the present invention. At step 201, a communication resource in each site of a first set of sites is allocated to a particular communication group, such that the particular communication group can begin a group call. The first set of sites may be established by any of the prior art methods, such as priority target communication units, busy override, or all sites in the system. Once the group call begins, an audience list of at least two communication units is established for this communication group (202). These communication units may be the target units, or predetermined based on a multitude of user needs. For example, if the user is a fire department, the fire chief may be designated as an active communication unit (i.e., one of the at least two communication units) for every group call that gets established. With the units identified, the audience list, which is a database, contains an identity of the communication unit (the unit's individual code, its talk group, and/or its unit alias) and an address of the site that is supporting the unit. With the audience list established, the central controller determines whether the communication unit that initiated the group call is identified in the audience list. If this unit is already part of the list (203), the group operation continues to 205. If the unit is not identified (203), the communication unit identity and its site location is added to the audience list (204).

When a transmission, or transmit operation, which may be a voice or data message, of the group call ends, a timer is initiated to clock out a first time period of 0.5–2.5 seconds (205). If another transmit operation is initiated before the first time period expires (205), the group call continues, the first time period is reset, and a determination is made if the audience list needs to be updated, or modified (206). The audience list is the audience list may be modified (211) if one of the communication units presently identified in the audience list moves to a new site. If this happens, the site location for that communication unit needs to be updated to reflect the new location. Another way to modify the audience list is to add new communication units (211). New communication units are units that were not originally identified as key, or target, units initially, but have transmitted a message to the communication group. Thus, for this new communication unit, the audience list is modified to include an identification of the new communication unit and the site location of the new communication unit.

If, however, the first time period expires (205), the communication resources allocated to the particular communication group are reclaimed by the central controller (207). With the communication resources reclaimed, a second time period is initiated (208). This second time period is set for about 10 seconds which takes advantage of the statistical information mentioned in the background section. If, prior to the expiration of the second time period (208), a transmit operation is received from a member of the particular communication group (209, communication resources are allocated to the particular communication group based on the information contained in the audience list (210). For example, if, after the communication resources have been reclaimed from a communication group of firefighters, one of the firefighters has one more thought that he needs to convey and initiates a push-to-talk (PTT). A PTT, which a transmit operation, will be received by the central controller and re-establish the group call based on the information stored in the audience list (the communication units listed and where they are located). Thus, all the members that participated in the previous group call will be included in this new group call. By re-establishing group calls in this manner, an entire group call set-up procedure can be avoided, thus saving valuable time.

If the second time period expires (208), the audience list is deleted (211). Thus, any subsequent requests for a group call for this particular communication group will be treated as new group call beginning at step 201. As would be generally understood by one of average skill in the art, when a communication unit relocates into a new communication site, a communication resource must be allocated in that site for the unit to continue to participate in the group call. If, when the unit relocates, a communication resource is not available, the group call may be suspended until a resource becomes available, or one may be made available by preempting another group call.

Figure 3:
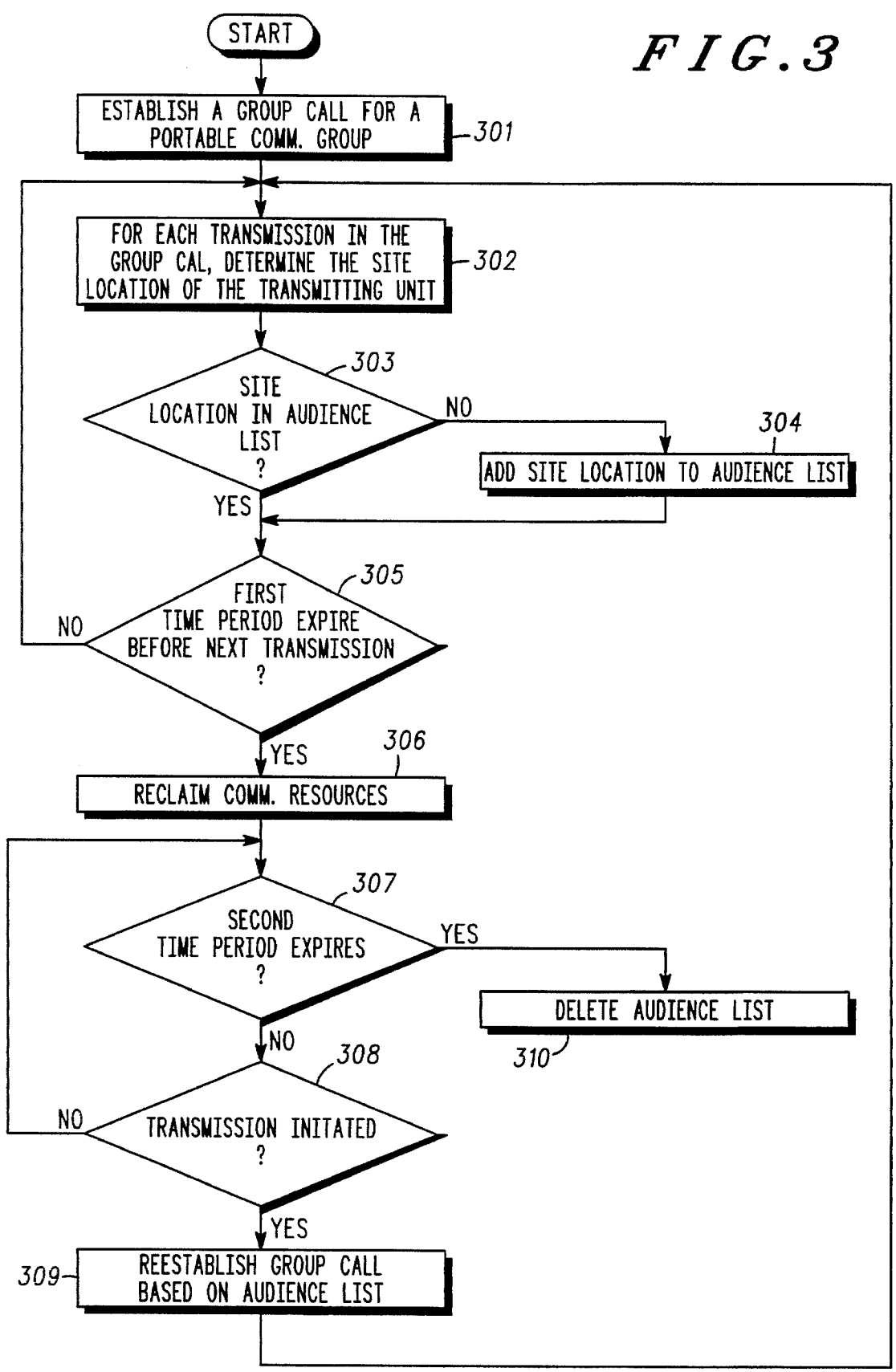
FIG. 3 illustrates an alternative logic diagram that a communication resource allocator may incorporate to implement the present invention.

FIG. 3 illustrates a logic diagram that a central controller may use to implement an alternate embodiment of the present invention. At step 301, a requesting communication unit within a communication site requests a group call for its affiliated group. The group call can be established in any one of the ways mentioned above: busy override, target unit identification, group member location, or all sites in the system. Regardless of how the group call was established, the central controller determines the site location of each communication unit when it transmits (302). Having determined the site location, the central controller determined whether the site location is already listed in the audience list (303). The audience list contains the address, or identity, of each site that has a communication unit of the particular communication group that has transmitted during the group call affiliated therewith. For example, the audience list may contain an array of flags to represent the absence or presence of a transmitting communication unit in a site. If a flag corresponding to a site is set, then the site is already identified as having a transmitting communication unit affiliated therewith (i.e., the site is already identified in the audience list). If the site is not listed in the audience list (303), the site is added to the audience list (304).

After verifying or adding a site to the audience list, the central controller determines whether a first time period expires (305). As mentioned above with reference to FIG. 2, the first time period has a duration of 0.5–2.5 seconds. The first time period is reset every time a member of the particular communication group transmits an operation (voice message or data message). If the first time period is reset, the process repeats at step 302. If, however, the first time period expires (305), the communication resources allocated to the particular communication group are reclaimed by the central controller (306). Having reclaimed the communication resources, the central controller initiates a second time period (307). As mentioned with reference to FIG. 2, the second time period has a duration of about 10 seconds.

While the second time period is clocking out, the central controller determines if it receives a transmission for a member of the particular communication group (308). If a transmission is received, the group call is re-established for the particular communication group based on the information contained in the audience list (309). For example, when a transmission is received during this time, the central controller allocates a communication resource in each site listed in the audience list. Having done this, the process repeats at step 302. If, however, the second time period expires (307), the audience list is deleted (310) and any subsequent transmissions will be treated as new group call requests.

The present invention provides a method for maintaining audience continuity for a communication group call. With such a method, a group call can be re-established within a predetermined period of time after a previous group call has ended without the need to evoke an entire group call set-up procedure. This method has substantially eliminated the 30 second call set-up time of the prior art by taking advantage of the statistic that most group calls originating within 10 seconds of the conclusion of a group call for the same communication group are related to the same subject, and thus need the same participants.

We claim:

1. A method for maintaining audience continuity of a communication group call, the method comprises the steps of:
   a) allocating a communication resource in each site of a first set of sites to establish a communication group call for a particular communication group;
   b) generating an audience list to include identity of at least two communication units of the particular communication group and site location of the at least two communication units;
   c) modifying the audience list with a new site location for one of the at least two communication units when the one of the at least two communication units relocates into a new site that is not within the first set of sites;
   d) modifying the audience list with an identity of another communication unit and a site location for the another communication unit when the another communication unit initiates a transmit operation;
   e) reclaiming the each communication resource in each site of the first set of sites when another transmit operation is not initiated by a member of the particular communication group before a first time period expires; and
   f) allocating a communication resource in each site that is identified as the site location for a communication unit in the audience list when a member of the particular communication group initiates the another transmit operation after the first time period has elapsed but prior to expiration of a second time period, such that, for the duration of the second time period, audience continuity is maintained for the particular communication group.

2. In the method of claim 1; step (c) further comprises allocating a communication resource in the new site, when the communication resource is available.

3. In the method of claim 2, step (c) further comprises reclaiming an allocated communication resource in the new site from a second communication group call to produce a reclaimed communication resource and allocating the reclaimed communication resource to the particular communication group, when the communication resource is not available.

4. In the method of claim 1, step (d) further comprises allocating a communication resource in another site identified as the site location for the another communication unit, when the another site does not presently have a communication resource allocated to the particular communication group.

5. The method of claim 1 further comprises deleting the audience list after the expiration of the second time period.

6. A method for maintaining audience continuity of a communication group call, the method comprising the steps of:
   a) allocating a communication resource in each site of a first set of predetermined sites to the particular communication group;
   b) generating an audience list to include identity of at least two communication units of the particular communication group and site location of the at least two communication units;
   c) modifying the audience list with a new site location for one of the at least two communication units when the one of the at least two communication units relocates into a new site that is not within the first set of sites, or modifying the audience list with an identity of another communication unit and a site location for the another communication unit when the another communication unit initiates a transmit operation; and
   d) prior to expiration of a predetermined period of time, utilizing the audience list to re-establish the communication group call for the particular communication group by allocating a communication resource in each site identified as a site location for each communication unit listed in the audience list, when the communication resources allocated to the particular communication group have been reclaimed.

7. The method of claim 6 further comprises deleting the audience list after the predetermined period of time elapses.

8. A method for maintaining audience continuity of a communication group call, the method comprising the steps of:
   a) establishing a group call for a particular communication group;
   b) generating an audience list of site locations of each communication unit that transmits during the group call, wherein the audience list includes a list of sites that have affiliated therewith, a communication unit that has transmitted during the group call;
   c) reclaiming the communication resources allocated to the particular communication group when another transmit operation is not initiated by a member of the particular communication group before a first time period expires; and
   d) when the member of the particular communication group initiates the transmit operation after expiration of the first time period but prior to expiration of a second time period, re-establishing the communication group call for the particular communication group in the each site listed in the audience list, such that, for the duration of the second time period, audience continuity is maintained for the particular communication group.

9. In the method of claim 8, step (a) further comprises storing the audience to produce stored site information.

10. The method of claim 9 further comprises deleting the stored site information when the second time period expires.

11. In the method of claim 8, step (d) further comprises re-establishing the communication group call with at least one site that is not listed in the audience list when the at least one site has a key communication unit affiliated therewith.

* * * * *